April 26, 1927.

K. E. PEILER 1,626,575

FABRICATING GLASSWARE IN SUCTION FED MOLDS

Filed Oct. 14, 1925

Inventor:
Karl E. Peiler
By Robson D Brown
Atty.

Patented Apr. 26, 1927.

1,626,575

UNITED STATES PATENT OFFICE.

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE.

FABRICATING GLASSWARE IN SUCTION-FED MOLDS.

Application filed October 14, 1925. Serial No. 62,334.

My invention relates to the manufacture of glassware by the Owens system employing suction-fed molds, and its primary object is to improve the quality of glassware made by this system, by applying positive plunger pressure to shape the neck or mouth end of the glass article in the suction mold after the mold is charged.

In the ordinary Owens machine, each parison mold is charged by sucking up molten glass into the mold, and the initial cavity in the glass is formed by blowing a puff of air into the upper or neck end of the mold, with or without the use of a neck plunger which is stationary in the neck end of the mold during the charging operation. The glass is caused to flow into the neck cavity of the mold, and around the neck plunger, by the suction which charges the mold.

According to my present invention, I charge each mold by suction in the usual manner, and I then insert a plunger into the charged mold to force the glass into the neck cavity of the mold, thereby obtaining certain advantages in respect to the definiteness of the neck cavity and the strength of the ware, as will be more fully pointed out below.

A bottom mold is preferably placed against the charging end of the mold after the mold has been charged, in order to impart the proper contour to the closed end of the glass article.

This invention not only is adapted to produce glass parisons to be later expanded in blow molds, but is also adapted to produce finished articles of pressed glassware, such as tumblers, jars, inkwells and the like.

Figure 1:
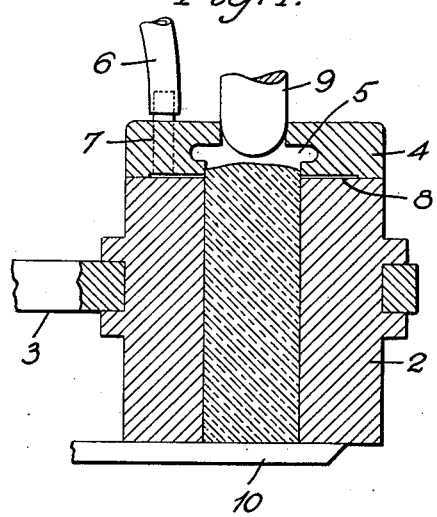
Figure 2:
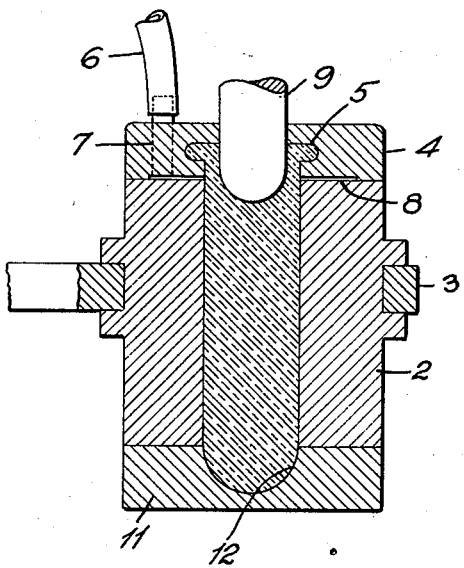

In the accompanying drawing, Figure 1 is a vertical sectional view taken centrally through a suction press mold constructed according to my present invention, showing the mold at the completion of the charging operation, with the severing knife in the place beneath the mold; and Fig. 2 is a vertical sectional view similar to Fig. 1, with the knife removed, the bottom mold in place, and the plunger inserted into the mold cavity.

In the drawing, the numeral 2 indicates a body mold carried upon a support 3 which may be one of the arms of a rotary glass working machine of the Owens type, or may be any other suitable support. The body mold 2 has a neck ring 4 having a cavity 5 of suitable contour to produce the desired neck finish of the glass article pressed in the mold. Suction is applied to the interior of the mold through a pipe 6, a connector 7 and a thin annular port 8 formed in the neck ring 4.

A pressing plunger 9 is mounted upon any convenient support, not shown, and is arranged to close the upper end of the mold cavity while the mold is being charged. The plunger at this time may occupy the position shown in Fig. 1.

The usual knife 10 is provided to sever the mold charge from the body of molten glass from which the charge has been sucked up. The mounting and operation of the knife 10 may be such as are customary in machines of the Owens type, and the knife-operating mechanism is therefore not illustrated herein.

A bottom mold 11 is preferably provided to close the bottom or charging end of the body mold 2 after the mold has been charged, and this bottom mold is provided with a cavity 12 of suitable contour to shape the bottom or closed end of the glass article.

The mold 2 may be provided with the usual cut-off ring and the usual leak grooves, according to ordinary practice in suction-fed glass molds.

In operation, the lower end of the body mold 2 is brought into contact with the surface of a body of molten glass, and suction is applied through the pipe 3, thus sucking up a charge of glass into the mold cavity until the glass rises in the mold to the level of the annular port 8 and stops the lifting of the glass by obstructing this port. The mold is then lifted, or the pool of glass is lowered away from the mold, and the knife 10 cuts off the mold charge from the parent body of glass. As soon as the glass is cut off, the knife is preferably replaced by the bottom plate 11, and the plunger 9 is pushed down into the glass, thereby extruding the glass upwardly into the neck cavity 5 with a positive pressure, and also forming the initial opening in the glass, as shown in Fig. 2.

The glass article formed by the mold illustrated in the drawing is a bottle blank or parison intended to be expanded to its final form by a subsequent blowing operation. However, the same principles are equally well adapted for use in making a complete pressed article not intended to be blown, in which case the contours of the mold sections and of the plunger are made to suit the outline of the finished article, and the plunger 9 is caused to enter the mold cavity to the extent necessary to complete the article.

Several advantages are obtained by the use of a pressing plunger in a suction-fed mold as described above. The pressure applied by the plunger is greater than that which can be produced at the neck end of the mold in the ordinary method wherein the glass is sucked around a stationary neck pin. Such increased pressure at the neck portion of the glass promotes quick setting of the glass while the glass is firmly compacted in the neck cavity of the mold. This quickly produces an accurate neck finish, which is highly important in certain classes of glassware, such as milk bottles, for example. Also, the neck cavity produced by the pressing plunger is definite in size and accurately placed, which is not the case when the initial cavity is formed in the usual way by introducing a puff of air into the glass while the bottom of the mold is open, and usually after the mold-halves have been removed from the glass.

The use of the pressing plunger in making bottle parisons also has the important advantage of producing stronger shoulders in the ware. This is because the glass is confined in the mold while the initial cavity is being formed by the plunger, and therefore the glass does not run down from the shoulder portions of the parison as it tends to do when the initial cavity is produced by means of a puff of air in the ordinary suction-mold practice. Further, the pressing plunger gives the parison a deeper inside shell of partially chilled glass than is ordinarily produced by the initial air puff, and this contributes to producing stronger shoulders in the ware.

A still further advantage of the present invention is that the bottom of the parison or other glass article is relatively free from shear-markings and is of definite shape.

The specific structural details shown and described herein are well adapted for carrying out my invention, but it will be understood that my invention also includes all such variations as fall within the scope of the appended claims.

I claim as my invention:

1. Glass-working apparatus comprising a body mold, means for producing suction in the interior of said mold, a charge-severing knife associated with said mold, a bottom mold adapted to close the charging end of said mold after charging, and a pressing plunger arranged to close the opposite end of said mold during charging and to thereafter enter said mold to press the glass therein.

2. Glass-working apparatus comprising a suction mold having a neck cavity, a body cavity, and a suction port communicating with the interior of said mold below said neck cavity.

3. Glass-working apparatus comprising a suction mold having a neck cavity, a body cavity, a suction port communicating with the interior of said mold below said neck cavity, and a pressing plunger arranged to enter the neck end of said mold.

4. Glass-working apparatus comprising a body mold and a neck mold having cooperating molding cavities and having between them an annular port communicating with the interior of said molds below the molding cavity of said neck mold, and means acting through said annular port for producing suction in said molding cavity.

5. Glass-working apparatus comprising a body mold and a neck mold having cooperating molding cavities and having between them an annular port communicating with the interior of said molds below the molding cavity of said neck mold, means acting through said annular port for producing suction in said molding cavity, and a plunger arranged to move through said neck mold cavity and to enter said body mold cavity.

Signed at Hartford, Connecticut this 12th day of October, 1925.

KARL E. PEILER.